United States Patent [19]

Takagi et al.

[11] Patent Number: 5,004,581

[45] Date of Patent: Apr. 2, 1991

[54] DISPERSION STRENGTHENED COPPER-BASE ALLOY FOR OVERLAY

[75] Inventors: Soya Takagi; Kazuhiko Mori; Minoru Kawasaki, all of Toyota; Shinji Kato, Miyoshi, all of Japan

[73] Assignee: Toyota Jidosha Kabushiki Kaisha, Toyota, Japan

[21] Appl. No.: 559,941

[22] Filed: Jul. 30, 1990

[30] Foreign Application Priority Data

Jul. 31, 1989 [JP] Japan ................................ 1-196784
Aug. 30, 1989 [JP] Japan ................................ 1-221613

[51] Int. Cl.$^5$ ................ C22C 9/02; C22C 9/04/9/06; C22C 9/08

[52] U.S. Cl. .................... 420/487; 148/412; 148/413; 148/414; 148/433; 148/434; 148/435; 420/473; 420/481

[58] Field of Search ........ 420/473, 481, 487; 148/412, 413, 414, 433, 434, 435

[56] References Cited

U.S. PATENT DOCUMENTS

| 3,293,029 | 12/1966 | Broderick et al. | 420/487 |
|---|---|---|---|
| 3,372,010 | 3/1968 | Parsons et al. | 75/237 |
| 4,244,679 | 1/1981 | Nakayama et al. | 420/473 |
| 4,818,307 | 4/1989 | Mori et al. | 420/487 |
| 4,851,191 | 7/1989 | Lee et al. | 148/433 |

FOREIGN PATENT DOCUMENTS

| 1096756 | 3/1981 | Canada . | |
|---|---|---|---|
| 49-7130 | 1/1974 | Japan . | |
| 49-7132 | 1/1974 | Japan . | |
| 57-41339 | 3/1982 | Japan ................................ | 148/433 |
| 57-73101 | 5/1982 | Japan . | |
| 58-179568 | 10/1983 | Japan . | |
| 59-43859 | 3/1984 | Japan . | |
| 60-52542 | 3/1985 | Japan . | |
| 61-243141 | 10/1986 | Japan . | |
| 62-250138 | 10/1987 | Japan . | |
| 62-256961 | 11/1987 | Japan . | |
| 63-157826 | 6/1988 | Japan . | |
| 62-206441 | 8/1988 | Japan . | |
| 63-264295 | 11/1988 | Japan . | |
| 64-238 | 1/1989 | Japan . | |
| 111831 | 4/1989 | Japan . | |
| 205043 | 4/1989 | Japan . | |
| 152232 | 6/1989 | Japan . | |
| 0312707 | 8/1971 | U.S.S.R. ................................ | 420/481 |
| 0323227 | 12/1971 | U.S.S.R. ................................ | 420/481 |
| 0359287 | 11/1972 | U.S.S.R. ................................ | 420/481 |
| 0454269 | 12/1974 | U.S.S.R. ................................ | 420/481 |

OTHER PUBLICATIONS

Cu-Sn phase diagram (Fig. 3-290) and Cu-Zn phase diagram (Fig. 3-297), "Metal Data Book", Maruzen (1974), pp. 442-443.
Diagram of Oxide Formation Free Energy-Temperature, F. D. Richardson et al., J. Iron Steel Inst., 160, 261(1948).
Monma and Sudo: "Constructional Metal Materials and Heat-Treatment Therefor", Japan Institute of Metals, 1980, pp. 20-25, 40-41.

*Primary Examiner*—R. Dean
*Assistant Examiner*—David W. Schumaker
*Attorney, Agent, or Firm*—Finnegan, Henderson, Farabow, Garrett & Dunner

[57] ABSTRACT

A dispersion strengthened Cu (copper)-base alloy for a wear-resistant overlay formed on a metal substrate consists essentially of, by weight %, Ni: 5 to 30%;
B: 0.5 to 3%;
Si: 1 to 5%;
Fe: 4 to 30%;
Sn: 3 to 15% and/or An: 3 to 30%; and the remainder being Cu and unavoidable impurities, and has a structure in which particles of boride and silicide of the Fe-Ni system are dispersed in a Cu-base matrix, and Cu-base primary crystals contain Sn and/or Zn in a solid solution state. If necessary, 0.1 to 5% of Al, 0.1 to 5% of Ti, and/or 1 to 10% of Mn may be added. 0.02 to 2% of C, and 0.1 to 10% of Cr and/or 0.3 to 5% of Ti may be further added. Instead of or along with Sn and/or Zn, 2 to 20% of Pb can be used, and nonsoluble Pb particles are uniformly dispersed between Cu-base α phase dendrites and serve as a solid lubricant.

11 Claims, 8 Drawing Sheets

DISPERSION STRENGTHENED COPPER-BASE ALLOY FOR OVERLAY

BACKGROUND OF THE INVENTION

1. Field of the Invention

The present invention relates to a Cu (copper)-base alloy used as an overlay, and more particularly, to a dispersion strengthened Cu-base alloy for forming an overlay (hardfacing layer) having a superior wear resistance and an improved heat-resistance on a metal substrate.

2. Description of the Related Art

Wear-resistant Cu-base materials include precipitation-strengthened alloys such as beryllium (Be) copper alloys containing about 2% of Be additive and Cu-Ni-Si alloys (e.g., Corson alloy) (cf., e.g., Monma and Sudo: "Constructional Metal Materials and Heat-treatment therefor (revised edition)", Metallurgical Engineering Series No. 1, Japan Institute of Metals, 1980, pp. 20–25), and particle dispersion-strengthened alloys in which hard particles of, e.g., oxide ($SiO_2$, $Cr_2O_3$, BeO, $TiO_2$, $ZrO_2$, MgO, MnO, etc.) are dispersed in a Cu-base matrix.

The precipitation-strengthened Cu alloys are subjected to a long time aging treatment, after a solution heat-treatment, to precipitate intermediate phases, intermetallic compounds and the like from the matrix for strengthening. The particle dispersion-strengthened Cu alloys are produced mainly by a sintering processor or an internal oxidation process. In the sintering process, a Cu or Cu alloy powder to made into a matrix is mixed with an oxide powder as a disperse phase, and the mixed powder is compacted and then sintered. In the internal oxidation process, a metal which is more easily oxidized than a Cu or Cu alloy matrix is added to the matrix and is then oxidized by oxygen diffused inwardly under an oxidizing atmosphere at a high temperature, to form oxide phases inside the matrix.

On the other hand, it is well known that a Cu-Pb system alloy, e.g., a Kelmet containing 25 to 35% of Pb, is used as a bearing metal, i.e., a Cu-base wear resistant material. The Cu-Pb system alloy has a structure in which a mixture of a soft Pb phase and a hard Cu phase do not mutually dissolve each other, and the hard Cu sustains a load and the soft Pb forms small hollows as oil reservoirs, and serves as a solid lubricant. (cf., e.g., the above-cited publication, pp. 40–41). Such a Cu-Pb system alloy bearing metal has superior antiseizing properties and has a larger load bearing capacity than that of a white metal, and thus it is suitable for a high speed, high load bearing. Nevertheless, since the Cu-Pb system alloy does not have a sufficient strength, when used for a high speed, high load bearing, it is joined to a backing metal having a suitable strength, to form a bimetal bearing.

The precipitation-strengthened alloys require a long time, high temperature heat-treatment for age precipitating fine particles by diffusion in a solid phase, and this heat-treatment is apt to generate strain in alloy members (parts) and is not suitable for large alloy members (parts). The precipitated particles give a required hardness to the strengthened alloy, but since the precipitated particles are very fine (e.g., several micrometers at most), the strengthened ally does not have a satisfactory wear-resistance, especially a resistance to slide abrasion. A higher resistance to slide abrasion is attained by hard particles having a grain size of 10 to 100 μm and dispersed in the alloy matrix, but it is difficult to precipitate such large size particles in precipitation-strengthened alloys.

Further, one type of the particle dispersion-strengthened alloys made through the internal oxidation process also requires a long time, high temperature heat-treatment for forming the dispersed oxide particles by diffusion in a solid phase, and this heat-treatment also is apt to generate strain in alloy members and is not suitable for large alloy members. Another type of particle dispersion-strengthened alloys obtained by the sintering process contains dispersed oxide particles having a desired grain size but requires a pressing step and a sintering step, by which product members are formed into suitable shapes, and it is difficult to locally form the particle dispersion-strengthened alloy portion in such a product member.

Still further, since the Cu-Pb system bearing alloy is joined to the backing metal of, e.g., steel, for producing a bearing, it is necessary to prepare a bearing supporting member (backing metal) with a high machining accuracy and a bearing member of the Cu-Pb system alloy, respectively, and it is difficult to produce a bearing having a complicated sliding shape. Accordingly, under severe conditions the Cu-Pb system bearing alloy does not have a sufficient wear-resistance, and thus has a lower durability.

The present inventors have studied particle dispersion-strengthened Cu-base alloys for wear-resistant overlays (hardfacing layers) deposited locally or wholly on a metal substrate, and have proposed Cu-base alloys having a structure in which hard particles of silicide and/or boride of Fe-Ni system, Ni-Cr system and the like are dispersed in a Cu-base matrix, for example, a Cu-Ni-Fe-Si-B alloy (see U.S. Pat. No. 4,828,307 based on Japanese Unexamined Patent Publication (Kokai) No. 63-157826), a Cu-Ni-Ti-Si-B alloy (see Japanese Unexamined Patent Publication (Kokai) No. 63-264295), a Cu-Ni-Fe-Cr-Si alloy (see Japanese Unexamined Patent Publication (Kokai) No. 01-111831), and a Cu-Ni-Cr-Si-B alloy (see Japanese Unexamined Patent Publication (Kokai) No. 01-152232), and the wear-resistance, especially a resistance to slide abrasion, of these Cu-base alloys is improved by the dispersed hard particles. Furthermore, the inventors have also proposed a particle dispersion-strengthened Cu-base alloy supplemented with 20 to 40% of Pb (i.e., Cu-Ni-Si-B-Pb alloy, (see Japanese Unexamined Patent Publication (Kokai) No. 01-205043) to give an additional Pb solid lubricity.

Nevertheless, where a particle dispersion-strengthened Cu-base alloy is used under severe conditions, e.g., for a valve seat in an internal combustion engine (e.g., automobile engine), the wear-resistance of the alloys is still not satisfactory, since during the operation of the automobile engine, face portions of the exhaust valves are heated at 700° C. or more, and an exhaust gas passing therethrough has a temperature of 1000° C. or more. When the valve seats come into contact with the heated valve face portion and are exposed to the exhaust gas flow of 1000° C. or more, the surface of the valve seats is also exposed in a very high temperature condition. In particular, the surface temperature of the Cu-base alloy valve sheets may be raised to a temperature close to a melting point thereof, and thus the surface of the Cu-base alloy valve seat is easily adhered to the valve face portion. Once this adhesion occurs, the Cu-base alloy material adhered to the valve face portion comes in contact with the Cu-base alloy surface of the valve seat, with the result that the adhesion becomes remarkable greater to cause considerable wear (abrasion) of the valve. This phenomenon occurs when the Cu-base alloy is used as a wear-resistant material in a sliding or contacting condition in a high temperature.

The above-mentioned conventional and proposed wear-resistant Cu-base alloys mainly utilize a strengthening effect obtained by a second phase precipitation or crystallization, and a solid solution strengthening of Cu rich α phase primary crystals (as a portion of a matrix) with Ni and the like occurs. Nevertheless, despite this solid solution strengthening, the Cu-base primary crystals are liable to adhesion. In particular, when the Cu-base alloy valve seat comes into contact with a valve face portion made of an alloy which is not easily oxidized, such as an austenitic steel, an Ni-base alloy, and a Co-base alloy, the primary crystals generate adhesion (become attached to the valve).

The Cu-base alloy proposed in the above-mentioned JPP'043 contains hard particles of silicide and boride of nickel, but depending on circumstances the Cu-base alloy may not have a sufficient wear-resistance.

SUMMARY OF THE INVENTION

An object of the present invention is to provide a Cu-base alloy for an overlay, which alloy has an increased wear-resistance obtained by improving a resistance to an adhesion thereof.

This and other object of the present invention are attained by providing a dispersion strengthened copper-base alloy for an overlay formed on a metal substrate consisting essentially of, by weight %.
Ni: 5 to 30%;
B: 0.5 to 3%;
Si: 1 to 5%;
Fe: 4 to 30%;
at least one metal selected from the group consisting of 3 to 15% of Sn and 3 to 30% of Zn; and
the remainder being Cu and unavoidable impurities, and having a structure in which particles of boride and silicide of Fe-Ni system are dispersed in a Cu-base matrix, and Cu-base primary crystals contain Sn and/or Zn in a solid solution state.

Preferably, the copper-base alloy consists essentially of, by weight %,
Ni: 10 to 25%;
B: 1.0 to 2.0%;
Si: 2 to 4%;
Fe: 4 to 15%;
Sn: 5 to 10% and/or Zn: 5 to 15%; and
the remainder being Cu and unavoidable impurities.

Also preferably, the Cu-base alloy further comprises at least one metal selected from the group consisting of 0.1 to 5% of Al, 0.1 to 5% of Ti and 1 to 10% of Mn, for increasing the strength of a Cu-base matrix and the toughness of dispersion phase particles.

Further preferably, the Cu-base alloy also comprises 0.02 to 2% of C, and at least one metal selected from the group consisting of 0.1 to 10% of Cr and 0.3 to 5% of Ti, for forming carbide particles as the hard particles.

The above-mentioned and other objects of the present invention are also attained by a dispersion strengthened copper-base alloy for a wear-resistant overlay formed on a metal substrate consisting essentially of, by weight %,
Ni: 5 to 30%;
B: 0.5 to 3%;
Si: 1 to 5%;
Fe: 4 to 30%;
Pb: 2 to 20%; and
the remainder being Cu and unavoidable impurities, and having a structure in which particles of boride and silicide are dispersed in a Cu-base matrix, and nonsoluble Pb particles are uniformly dispersed between Cu-base α phase dendrites.

Preferably, the copper-base alloy consists essentially of, by weight %,
Ni: 10 to 25%;
B: 1.0 to 2.0%;
Si: 2 to 4%;
Fe: 4 to 15%;
Pb: 3 to 10%; and
the remainder being Cu and unavoidable impurities.

Further preferably, the Cu-base alloy containing Pb comprises one material selected from the group consisting of 0.1 to 5% of Al, 1 to 20% of Cr and 1 to 20% of high melting point carbide particles.

Furthermore, the addition of Pb is combined with the addition of Sn and/or Zn.

BRIEF DESCRIPTION OF THE DRAWINGS

The present invention will be more apparent from the description of the preferred embodiments set forth below, with reference to the accompanying drawings, in which.

DESCRIPTION OF THE PREFERRED EMBODIMENTS

The particle dispersion-strengthened Cu-base alloy according to the present invention is easily melted and deposited on a metal substrate by using a high-density heating energy such as a laser beam, a TIG arc, a plasma arc and an electron beam to form an overlay (hardfacing layer) in a manner similar to that described in the previously mentioned patent publications (e.g., U.S. Pat. No. 4,818,307). The formed overlay of the Cu-base alloy has a structure consisting of a Cu-base matrix [primary crystal of Cu-Ni (+Zn, Sn) and Ni (Cu) silicide] having a hardness of Hv 150 to 250, and hard particles of boride and silicide of the Fe-Ni system having a hardness of Hv 700 to 1200 and dispersed almost uniformly in the matrix. Where the Cu-base alloy contains Cr, particles of boride and silicide of the Cr-Ni systems and the Fe-Cr-Ni system, as well as the Fe-Ni system. The dispersed hard particles have a grain size of about 5 to 1000 μm and have an area ratio of 2 to 30%, and thus the dispersed hard particles of the Fe-Ni system boride and silicide provide a superior wear-resistance, especially a high resistance to slide abrasion. Where an addition of C (carbon) is made, hard carbide particles are dispersed, as well as the boride and silicide particles, to further increase the wear-resistance.

To improve the resistance to adhesion of the Cu-base primary crystals, in accordance with the present invention, Sn and/or Zn are dissolved in the Cu-base primary crystals. The dissolved additive metals are more easily oxidized than Cu, and thus oxide films of Sn and Zn (i.e., internal oxide layers) are formed on a friction surface of the Cu-base alloy, to thereby suppress and prevent adhesion upon a metal-to-metal contact. The better oxidation of Sn and Zn compared with the oxidation of Cu is apparent from the diagram of oxide formation free energy-temperature shown in F. D. Richardson and J. H. E. Jeffes, J. Iron Steel Inst., 160, 261 (1948), Thermodynamics of Solid: Swalin, Maruzen Publisher. Furthermore, at 800° C., the diffusion coefficients of Sn, Zn and Cu in the Cu are D (Sn in Cu)=$7.51 \times 10^{-11}$ cm$^2$/sec, D (Zn in Cu)=$1.75 \times 10^{-10}$ cm$^2$/sec, and D (Cu in Cu)=$5.09 \times 10^{-11}$ cm$^2$/sec, respectively, and thus the diffusion coefficients of Sn and Zn are larger than that of Cu. Therefore, SnO$_2$ and ZnO are preferentially formed on a surface of the Cu-base primary crystals, instead of a formation of CuO.

On the other hand, when the Cu-base alloy containing Pb is exposed to a high temperature atmosphere, e.g., to the exhaust gas flow of an internal combustion engine, the monosoluble Pb particles become slushy at a high temperature of 300° to 400° C. and ooze on the sliding surface, with the result that the Pb serves as a solid lubricant to thereby improve the wear-resistance and the resistance to adhesion.

It is preferable to combine the Pb addition with the and/or Zn addition for obtaining multiplier effects caused by these additions.

The reasons for defining the composition of the Cu-base alloy according to the present invention will be explained in the following.

Ni (nickel) is dissolved in the Cu-base matrix in a solid solution state to strengthen the matrix and forms the hard boride and silicide particles of the Fe-Ni system. Less than 5% of Ni will not strengthen the matrix, and more than 30% of Ni lowers the weldability (depositability) to a metal substrate, especially to an Al alloy substrate. In the worst case, it is possible to peel a local welding (deposition) of the Cu-base alloy from the metal substrate, with the result that the intended improvement of the wear-resistance is not obtained. The weldability (depositability) means a wettability of the deposited Cu-base alloy to the substrate, a generation/non-generation of cracks or exfoliation at the interface of the deposited alloy and the substrate, and a formation/non-formation of underbead cracks.

Si (silicon) forms hard silicide particles of the Fe-Ni system and strengthens the Cu-base matrix. Less than 1% of Si will not form the silicide hard particles, and more than 5% of Si leads to the generation of cracks in the Cu-base alloy overlay upon the deposition thereof on the metal substrate.

B (boron) forms hard boride particles of the Fe-Ni system and strengthens the Cu-base matrix. Less than 0.5% of B will not form the boride hard particles, and more than 3% of B leads to the generation of cracks in the Cu-base alloy overlay upon the deposition thereof on the metal substrate.

Fe (iron) is little dissolved in the Cu-base matrix in a solid solution state and is a major element in the forming of the boride and silicide hard particles of the Fe-Ni system. Less than 4% of Fe will not form a sufficiently dispersed amount of the hard particles, and more than 30% of Fe lowers the weldability (depositability) to a metal substrate, especially to an Al alloy substrate.

In particular, as compared with the Cu-base alloy of JPP'043 containg no Fe, Fe form the Fe-Ni system compound hard particles for improving the wear-resistance.

Sn (tin) increases the resistance to adhesion of the Cu-base alloy, due to the formation of a tin oxide film on the Cu-base primary crystals. Less than 3% of Sn will not improve the resistance to adhesion, and more than 15% of Sn will cause the formation of cracks in an overlay deposited by using a laser or TIG (Tungsten Inert Gas) arc. Where the Sn content is larger than 15%, a second phase (a structure assumed to be a β phase) becomes a factor in the crack formation. From the Cu-Sn phase diagram (see "Metal Data Book", edited by the Japanese Institute of Metals, Maruzen, (1974), p. 442, FIG. 3-290), it can be seen that 15% of Sn is very close to the maximum value at which Sn is dissolved in the α phase. Since the overlaying (deposition) of the Cu-base alloy inevitably includes a relatively rapid cooling step, a solubility of Sn at a high temperature remains in the primary crystals of the produced overlay.

Zn (zinc) also increases the resistance to adhesion of the Cu-base alloy, due to the formation of a zinc oxide film on the Cu-base primary crystals. Less than 3% of Zn will not improve the resistance to adhesion, and mere than 30% of Zn will cause the formation of cracks in an overlay deposited by using a laser or TIG arc. Where the Zn content is larger than 30%, a second phase becomes a factor of crack formation. From the Cu-Zn phase diagram (see "Metal Data Book", edited by the Japanese Institute of Metals, Maruzen, (1974), p. 443, FIG. 3-297), it can be seen that 30% of Zn is close to the maximum value at which Zn is dissolved in the α phase. Since the overlaying (deposition) of the Cu-base alloy also inevitably includes a relatively rapid cooling step, a solubility of Zn at a high temperature is remains in the primary crystals of the produced overlay.

Al (aluminum), Ti (titanium) and Mn (manganese) are additives which increase the strength of the Cu-base matrix and dispersion phase particles. Amounts less than the lower limits (0.1% of Al, 0.1% of Ti and 1% of Mn) of the additive elements will not provide a sufficient strengthening effect, and amounts more than the upper limits (5% of Al, 5% of Ti and 10% of Mn) of the additive elements reduce the toughness of the Cu-base alloy overlay.

C (carbon) and at least one of Cr (chromium) and Ti are added to form carbide hard particles which further increase the wear-resistance, in addition to the boride and silicide hard particles. In particular, Cr contributes to the formation of boride and silicide hard particles of the Ni-Cr system and the Fe-Cr-Ni system. Amounts less than the lower limits (0.02% of C, 0.5% of Cr and 0.3% of Ti) of the additive elements will not sufficiently increase the wear-resistance, and amounts more than the upper limits (2% of C, 10% of Cr and 5% of Ti) of the additive elements reduced the toughness of the Cu-base alloy overlay and lower the weldability (depositability) of the overlay to a metal substrate, especially to an Al alloy substrate.

Pb (lead) is added to give a solid lubricant effect in a high temperature atmosphere. Less than 2% of Pb will give little improvement of the wear-resistance and the resistance to adhesion, and more than 20% of Pb will contribute to a coagulation of the hard particles to form masses of several hundred μm to 2 mm, which strongly abrade other members coming in contact with the Cu-base alloy member.

The Al additive is as above-mentioned.

Cr (chromium) forms boride and silicide hard particles having a dispersion-strengthening effect, and the existence of Pb can expand the content range of Cr. Less than 1% of Cr will not form uniformly dispersed hard particles, and more than 20% of Cr will lower the weldability (depositability).

The high melting point carbide, such as WC, TaC, TiC, $Cr_3C_2$, VC and NbC, forms hard particles dispersed in the Cu-base matrix, to thereby further increase the wear-resistance. The carbides have a melting point of more than 1500° C. and do not substantially react with the Cu-base alloy. Less than 1% of the carbide will not increase the wear-resistanc, and more than 20% of the carbide will lower the weldability (depositability).

An overlay (hardfacing layer) of the particle dispersion-strengthened Cu-base alloy according to the present invention can be easily formed on a suitable metal substrate of Al alloy, steel cast iron or the like by depositing (welding) the Cu-base alloy to the substrate, using a high density heating energy such as a laser beam, a TIG arc, a plasma arc, and an electron beam. For example, either an alloy powder having a composition of the particle dispersion-strengthened Cu-base alloy of the present invention or mixture powder blended to obtain that composition is preset or fed onto a surface of the metal substrate to be provided with an improved wear-resistance, and is quickly melted by an irradiation of a high density heating energy such as a laser beam. The melt is then quenched (rapidly cooled) either by moving the irradiation spot of the heating energy to a subsequent position or by interrupting the irradiation to allow the melt to solidify, to thereby from an overlay (hardfacing layer) metallurgically bonded to the metal substrate. It is possible to use a welding rod (filler rod) instead of the alloy powder and mixture powder, and the welding rod is melted and solidified to form the overlay in the same manner as described above.

The overlay of the particle dispersion-strengthened alloy of the present invention is formed on the metal substrate by laser irradiation, in a manner described in, e.g., U.S. Pat. No. 4,818,307.

Figures 1, 3:
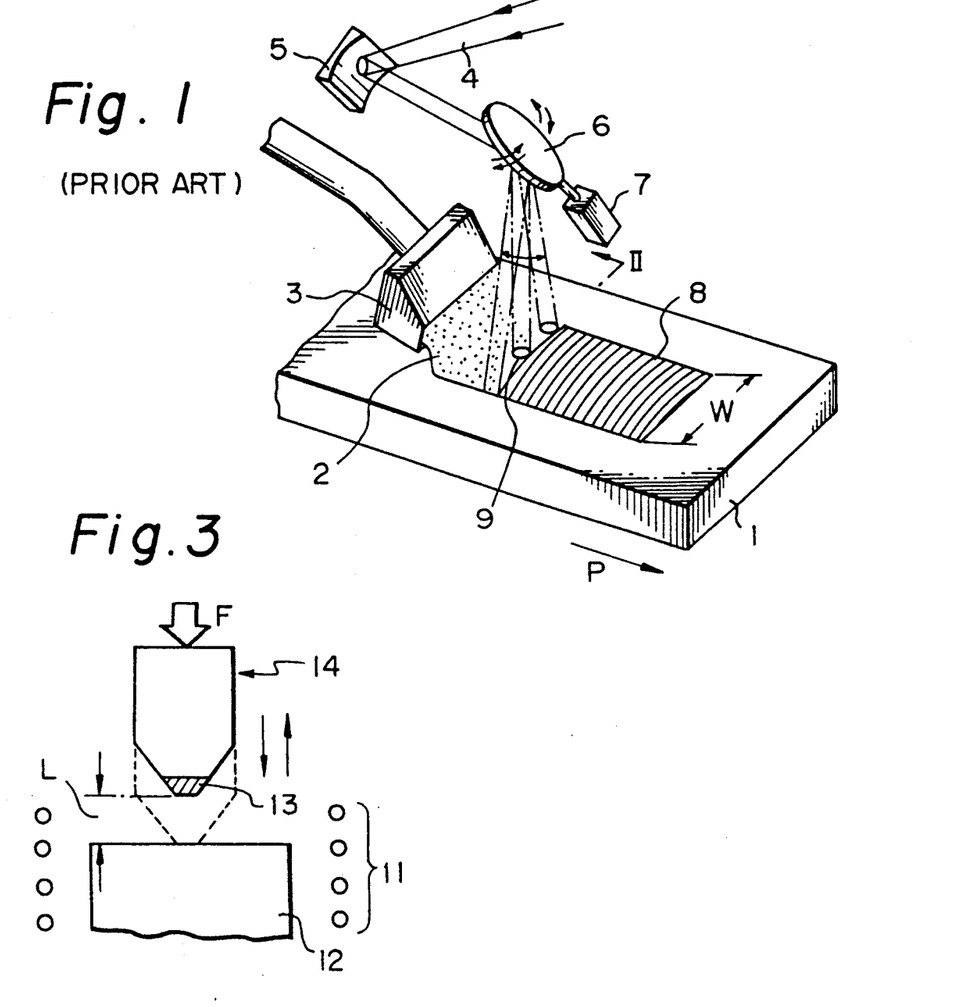
FIG. 1 is a schematic perspective view showing an apparatus for depositing (forming) an overlay by using a laser beam.
FIG. 3 is a schematic illustration of a test piece and a valve in a test for evaluating the resistance thereof to adhesion.

The following examples and comparative examples are performed by using an apparatus shown in FIG. 1.

A metal substrate (e.g., Al alloy plate) 1 is continuously moved at a constant velocity of 450 to 2000 mm/min in a direction of an arrow P, and an alloy powder or a mixed powder 2 of the Cu-base alloy according to the present invention or a comparative examples is continuously fed onto the metal substrate 1 from a hopper (not shown) through a powder feed pipe 3. The fed powder 2 has a width W taken at right angles to the moving direction P. A laser beam 4 emitted from a laser (not shown) is reflected by a reflecting mirror 5, and further reflected by an oscillating mirror 6, to irradiate the powder 2 set on the metal substrate 1. The laser beam 4 is concentrated to a diameter of 0.5 to 5.0 mm and an energy density of $1 \times 10^2$ to $2 \times 10^4$ W/mm². The oscillating mirror 6 is swung within a predetermined angular range by a swing mechanism 7 such as a galvanometer, so that the laser beam 4 scans the powder 2 at a frequency of 10 to 500 Hz in a direction perpendicular to the moving direction P of the metal substrate 1.

When the powder 2 on the metal substrate 1 is irradiated with the laser beam 4, it is melted to form a melt 9. The melt 9 is agitated by scanning the laser beam 4. Thereafter, when the melt 9 is not irradiated with the laser beam 4 by moving the metal substrate 1 in a direction P, the heat of the melt 9 is removed by a heat transfer to the metal substrate 1, to thereby rapidly solidify the melt 9 into an overlay (deposited layer) 8, as shown in FIG. 1.

EXAMPLE 1

Four alloy powders (powders A, B, and C according to the present invention and powder D of a comparative example) having the following compositions were prepared by a conventional powder formation process.

A: Cu-19.9Ni-2.96Si-1.38B-8.02Fe-7.89Zn
B: Cu-19.3Ni-2.93Si-1.25B-7.55Fe-10.4Sn
C: Cu-19.6Ni-2.95Si-1.32B-7.72Fe-3.95Zn-5.2Sn
D: Cu-20.1Ni-2.96Si-1.36B-7.96Fe

Each of the alloy powders was fed onto an Al alloy substrate (Al-alloy cast AC-2C: JIS H 5202) and was irradiated with a laser beam as a heating source to deposit a particle dispersion-strengthened Cu-base alloy overlay (hardfacing layer) A, B, C and D, respectively, by adopting the following deposition conditions.

Laser power: 4.5 kW
Laser beam diameter: 2.5 mm
Laser irradiation energy density: 270 W/mm²
Laser beam oscillation width: 7 mm
Laser oscillation frequency: 200 Hz
Substrate movement velocity: 800 mm/min The formed overlays A to D were then ground to form test pieces A to D, respectively.

Figure 2A:
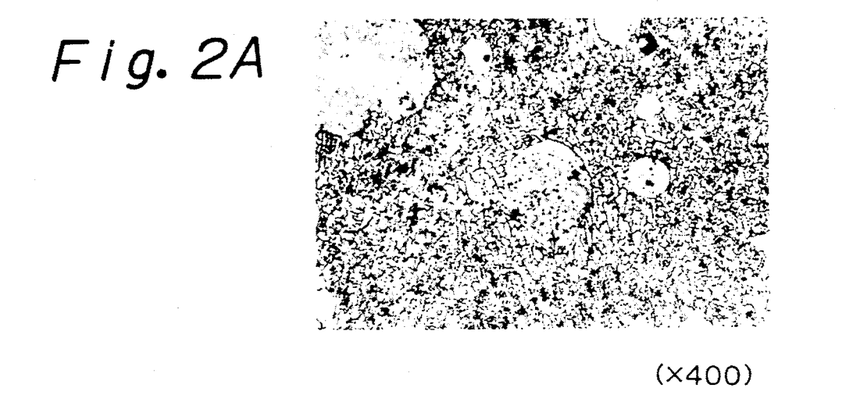
FIGS. 2A, 2B and 2C are photomicrographs (×400) showing the metal structures of particle dispersion-strengthened alloy overlays A to C according to the present invention, respectively.
Figure 2B:
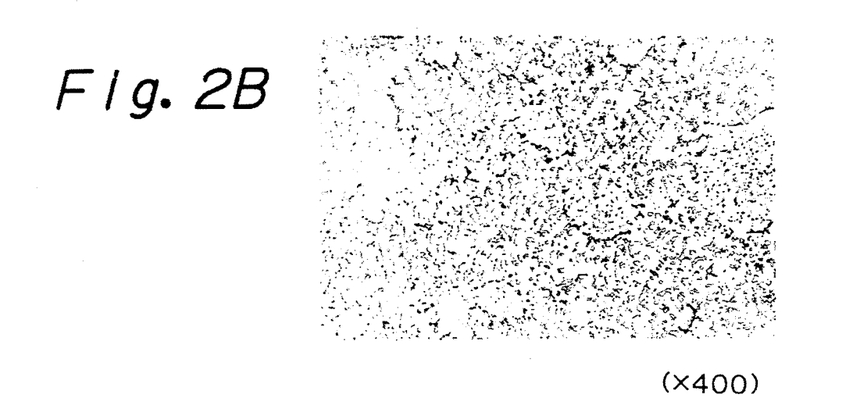
Figure 2C:
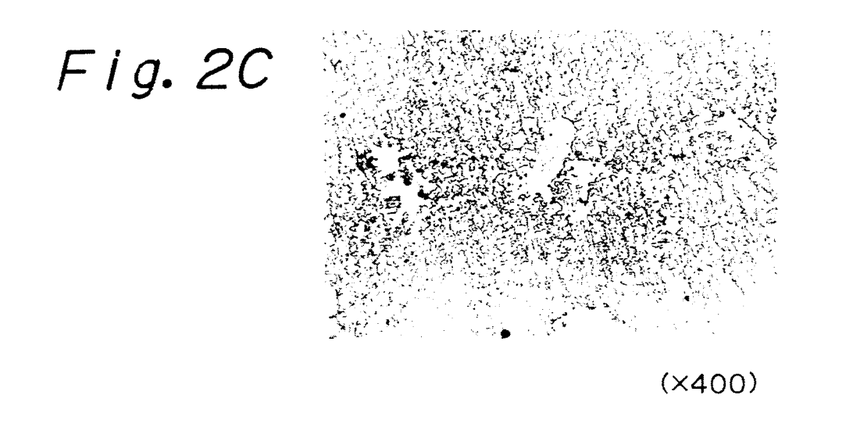

The structures of the overlays A to C of the Cu-base alloys of the present invention are shown in the photomicrographs (×400) of FIGS. 2A, 2B, and 2C, respectively, in which the boride and silicide particles of the Fe-Ni system are dispersed over the entire structure. The contents of Zn and Sn in the Cu-base primary crystals as found by an EPMA analysis were: Zn=10 to 18% in the overlay A; Sn=12 to 22% in the overlay B; and Zn=5 to 10% and Sn=8 to 15% in the overlay C.

Figure 4:
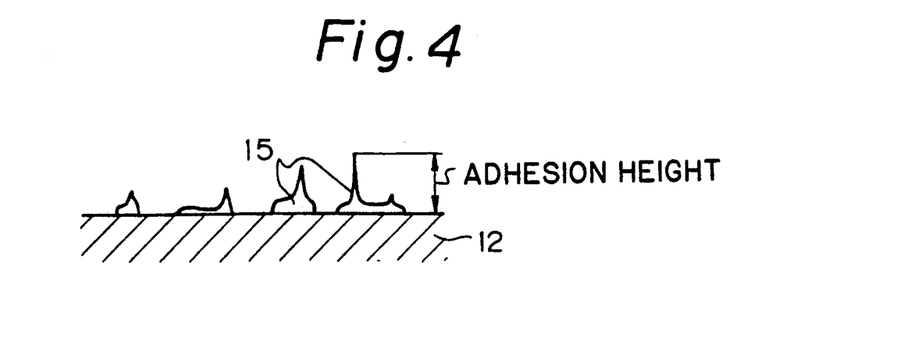
FIG. 4 is a schematic sectional view of adhered materials on a metal substrate.
Figure 5:
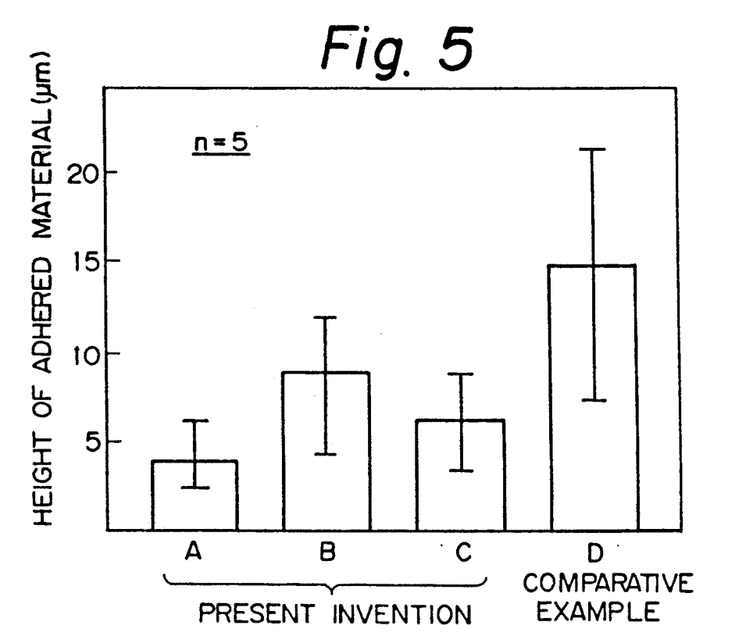
FIG. 5 is a graph showing the adhesive material heights of particle dispersion-strengthened alloy overlays of the present invention and a comparative example.

To evaluate an adhesion property of the Cu-base alloy overlays A to D, as shown in FIG. 3, the test piece 14 with the overlay 13 was reciprocatively pushed against a valve member 12 heated by a heater 11. The test conditions were: a heating temperature of 300° to 350° C. (at the contact surface); a pushing force F of 20 kgf (a pressure of 5 kg/mm$^2$); a reciprocating distance L of 5 mm; a reciprocating rate of 500 cycles/min; and a test time of 30 minutes. The valve member was made of 21Cr-4Ni steel (SUH35: JIS-G-4311). After the test, a height of the Cu-base alloy materials 15 adhered to the valve member 12 (FIG. 4) was measured with a roughness instrument, to obtain the data shown in FIG. 5. As is obvious from FIG. 5, the Cu-base alloys A, B, and C of the present invention have lower heights and less amounts of adhered Cu-base alloy materials 15, compared with the Cu-base alloy D of the comparative example.

EXAMPLE 2

Cu-base alloy powders of 1 Cu-20Ni-3Si-1.5B-8Fe, without Sn and Zn (prior art), 2 Cu-20Ni-3Si-1.5B-8Fe, with Sn (present invention), and 3 Cu-20Ni-3Si-1.5B-8Fe, with Zn (present invention) were prepared and deposited on the Al alloy substrate to form overlays, and the overlays then ground to form test pieces in the same manner as explained in Example 1. The hardness of the Cu-base alloy primary crystals of the overlays was measured to obtain the data shown in FIG. 6, in accordance with the added amounts of Sn and Zn.

Figure 6:
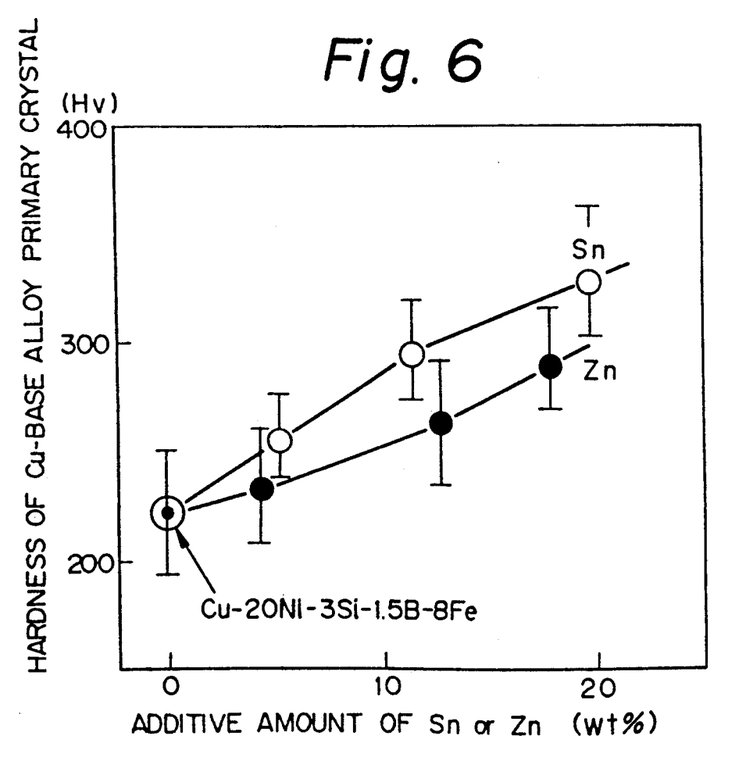
FIG. 6 is a graph showing a relationship between the added contents of Sn and Zn and the hardness of the Cu-base primary crystal.

As is obvious from FIG. 6, the addition of Sn and Zn increases the hardness of the primary crystals by Hv 30 to 100, compared with that of the conventional particle dispersion-strengthened Cu-base alloy without Sn and Zn and it is obvious that such an increased hardness improves the wear-resistance.

EXAMPLE 3

Figure 7A:
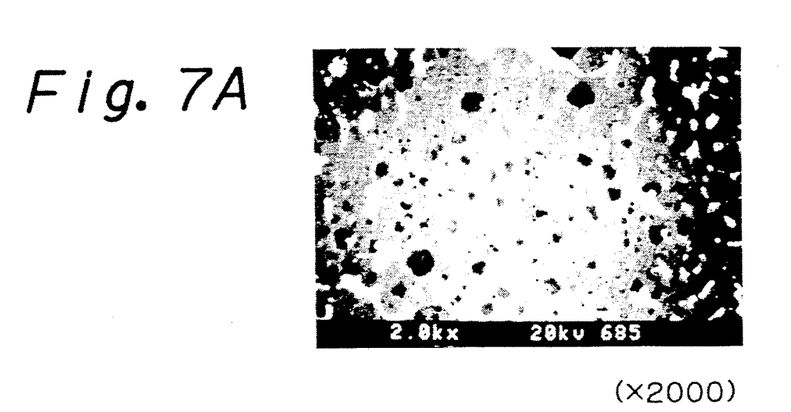
FIG. 7A is a photomicrograph (×2000) of a reflective X-ray image of a metal structure of the Cu-base alloy overlay of Example 3 obtained by an EPMA (electron probe microanalysis) instrument.
Figure 7B:
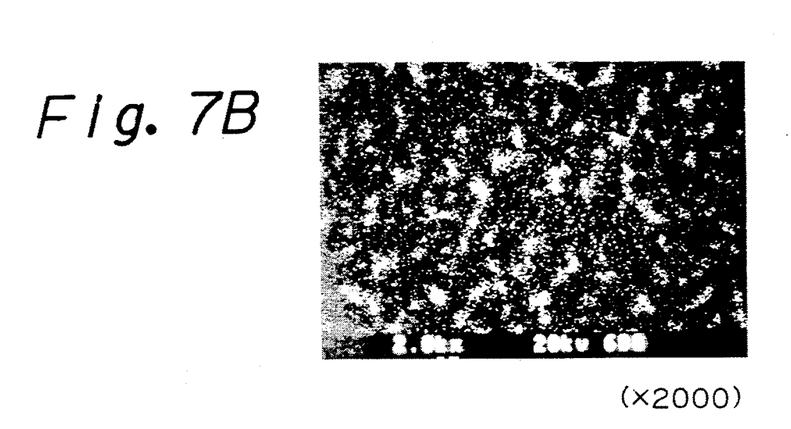
FIG. 7B is a photomicrograph (×2000) showing a Pb surface-distribution on the metal structure of the overlay of Example 3, obtained by an EPMA instrument.
Figure 7C:
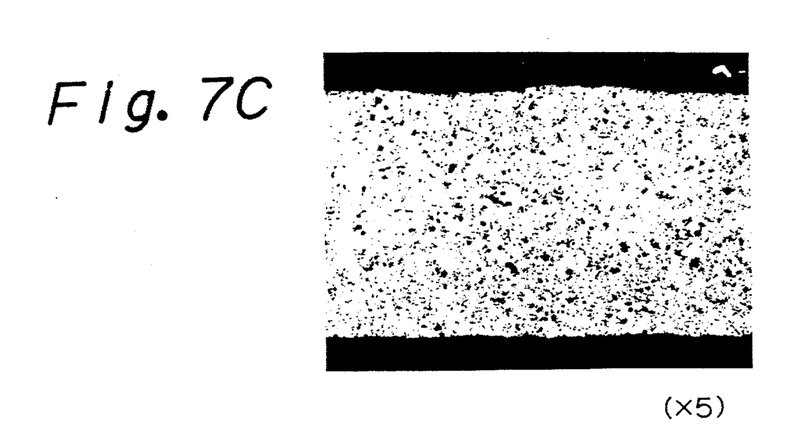
FIG. 7C is a photograph (×5) of a metal structure of the overlay of Example 3 at the ground surface thereof.

A Cu-base alloy powder of Cu-15Ni-3%Si-1.5B-8Fe-10Pb having a grain size of from −80 to +340 mesh was prepared and deposited on the Al alloy (AC-2C) substrate under the following conditions, to form a Cu-base alloy overlay, and the overlay then ground.
Laser power: 2.8 kW
Laser beam diameter: 1.5 mm
Laser irradiation energy density: 1600 W/mm$^2$
Laser beam oscillation width: 6 mm
Laser oscillation frequency: 200 Hz
Substrate movement velocity: 800 mm/min The formed overlay had the structure as shown in FIGS. 7A, 7B and 7C. As can be seen from FIGS. 7A and 7B, silicide particles of the Ni-Fe system having a hardness of about Hv 900 and an average particle size of 45 μm occupy about 3 volume %, and boride particles of the Ni-Fe system having a hardness of about Hv 1200 and an average particle size of 5 μm occupy about 4 volume %. These particles are uniformly dispersed in the Cr-base matrix having a hardness of about Hv 220, and Pb having an average grain size of 4 μm and a grain size range of 1 to 10 μm is uniformly dispersed between dendrites of the Cu-base α phase.

EXAMPLE 4

A Cu-base alloy powder of Cu-15Ni-3Si-1.5B-8Fe-2Pb was prepared and deposited on the Al alloy (AC-2C) substrate under the same conditions as in Example 3, to form a Cu-base alloy overlay, and the overlay then ground.

Figure 8A:
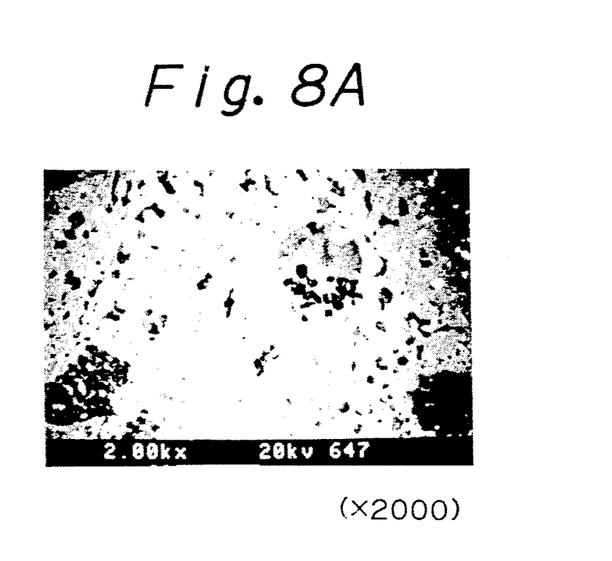
FIG. 8A is a photomicrograph (×2000) of a reflective X-ray image of a metal structure of the Cu-base alloy overlay of Example 4, obtained by an EPMA instrument.
Figure 8B:
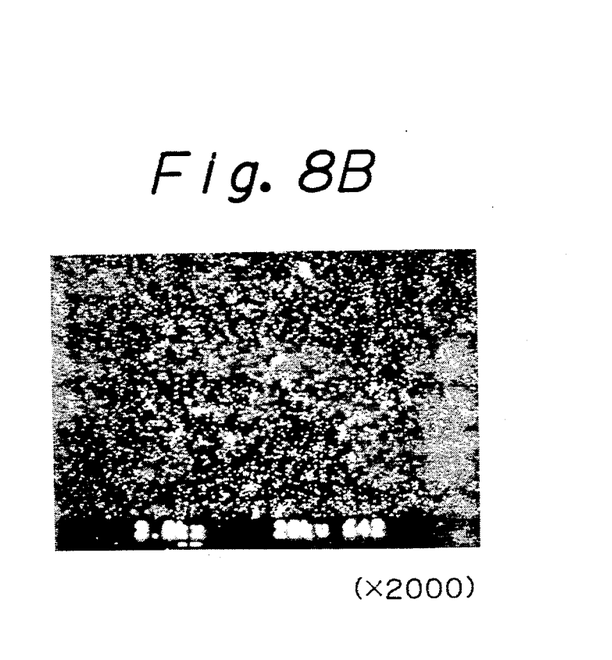
FIG. 8B is a photomicrograph (×2000) showing a Pb surface-distribution on the metal structure of the overlay of Example 4, obtained by an EPMA instrument.

The formed overlay had a structure as shown in FIGS. 8A and 8B. The structure of the overlay is almost the same as that of the overlay in Example 3, except that Pb having an average grain size of 2 μm and a grain size range of 1 to 8 μm is uniformly dispersed between dendrites of the Cu-base α phase.

Comparative Example 1

Figure 9:
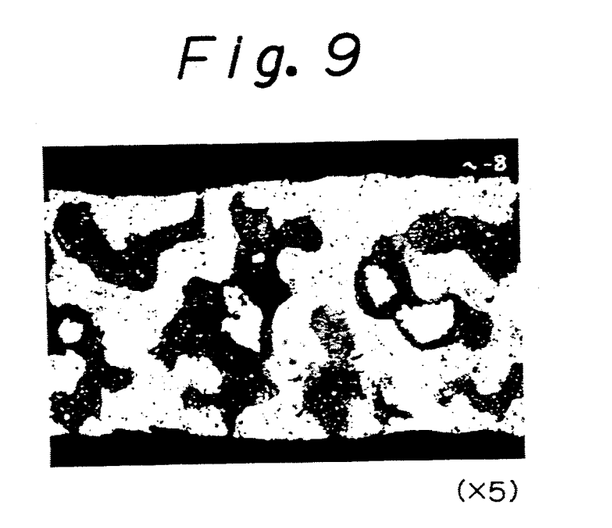
FIG. 9 is a photograph (×5) of a metal structure of a Cu-base alloy overlay of Comparative Example 1 at the ground surface thereof.

A Cu-base alloy powder of Cu-15Ni-3Si-1.5B-8Fe-30Pb (the Pb content being larger than the upper limit (20%) of the present invention) was prepared and deposited on the Al alloy (AC-2C) substrate under the following conditions, to form a Cu-base alloy overlay, and the overlay then ground.
Laser power: 3.0 kW
Laser beam diameter: 2.0 mm
Laser irradiation energy density: 950 W/mm$^2$
Laser beam oscillation width: 6 mm
Laser oscillation frequency: 100 Hz
Substrate movement velocity: 850 nn/min The formed overlay had a structure as shown in FIG. 9, in which silicide particles and boride particles of the Ni-Fe system were coagulated to form massive hard layers (portions), cf. FIG. 7C of Example 3.

EXAMPLE 5

Figure 10:
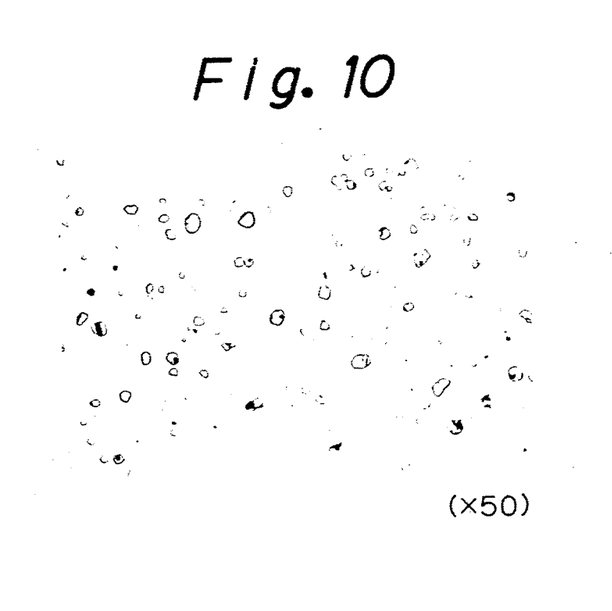
FIG. 10 is a photomicrograph (×50) of a metal structure showing TaC particles of a Cu-base alloy overlay of Example 5.

A Cu-base alloy powder off Cu-20Ni-3Si-1.5B-7Fe-3Cr-4Al-5Pb-5TaC was prepared and deposited on the Al alloy (AC-2C) substrate under the following conditions, to form a Cu-base alloy overlay, and the overlay then ground.
Laser power: 3.6 kW
Laser beam diameter: 2.5 mm
Laser irradiation energy density: 600 W/mm$^2$
Laser beam oscillation width: 6 mm
Laser oscillation frequency: 200 Hz
Substrate movement velocity: 650 nn/min The formed overlay had a structure as shown in FIG. 10, in which the high melting point carbide particles of added TaC are uniformly dispersed. In this case, silicide particles (having an average particle size of 40 μm) of the Ni-Fe system and boride particles (having an average particle size of 10 μm) of the Ni-Cr system occupy about 5 volume% and are uniformly dispersed in the Cu-base alloy matrix, and nonsoluble Pb particles having an average particle size of about 2 μm are dispersed between Cu-base α phase dendrites.

The boride particles has a hardness of Hv 1100 to Hv 1300, and the TaC particles have a hardness of Hv 1700 to Hv 1900. Furthermore, the addition of Al and Cr and the increase of Ni contribute to a raise of the Cu-base alloy matrix hardness to about Hv 320, as compared with that (Hv 220) of the overlay of Example 3.

Abrasion Tests

Figure 11:
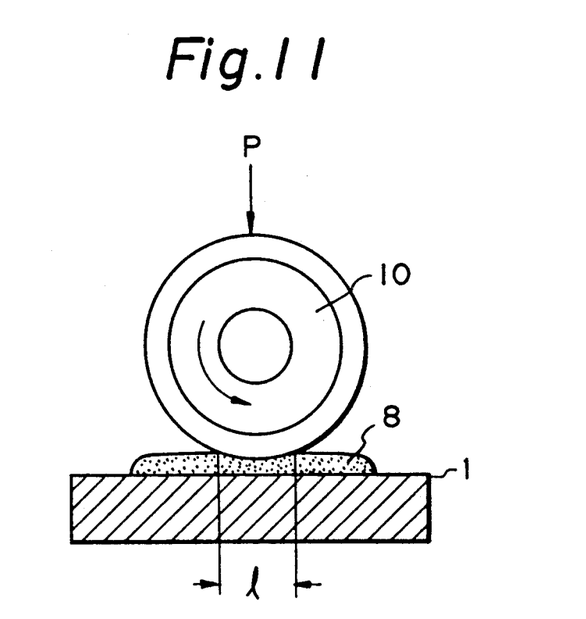
FIG. 11 is a schematic view of the Ohgoshi type abrasion tester and an overlay on a metal substrate.

To evaluate a sliding wear property of the overlays of particle dispersion-strengthened Cu-base alloy formed in Examples 3, 4 and 5, the overlays were subjected to an abrasion test by an Ohgoshi type abrasion tester, respectively, as shown in FIG. 11. In this test, a rotating rotor 10 made of a hardened alloy tool steel (SKD) is pressed on the overlay δ deposited on the metal substrate 1, with the result that a wear dent is formed in the overlay 8, and the length l of the formed wear dent is measured. The test conditions were: a rotational speed of 0.3 m/sec; a total sliding distance of 100 m; and a final load P of 10 kg.

Figure 12:
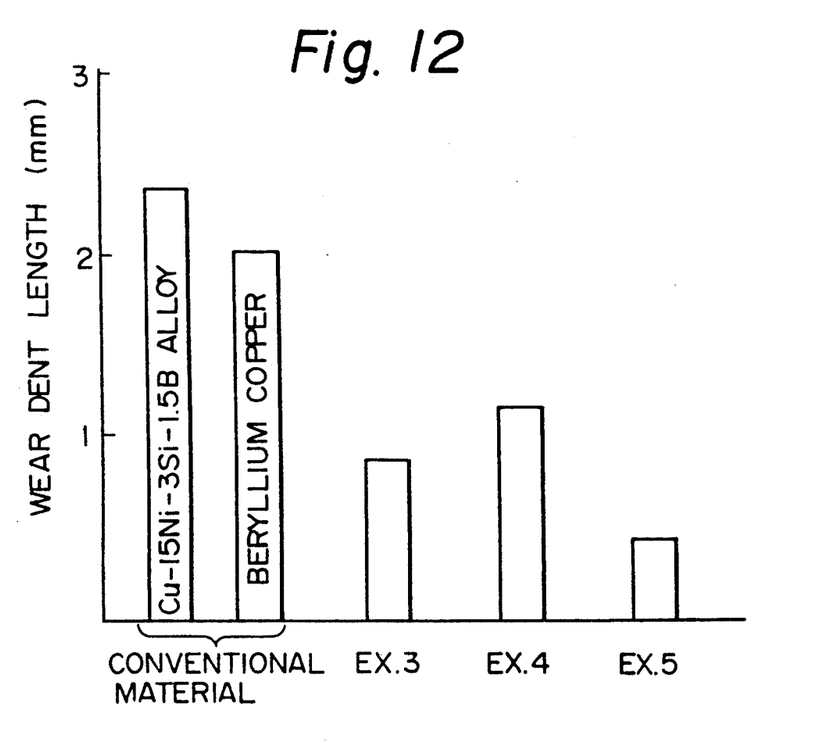
FIG. 12 is a graph showing the results (wear dent lengths) of the abrasion tests.
Figure 13:
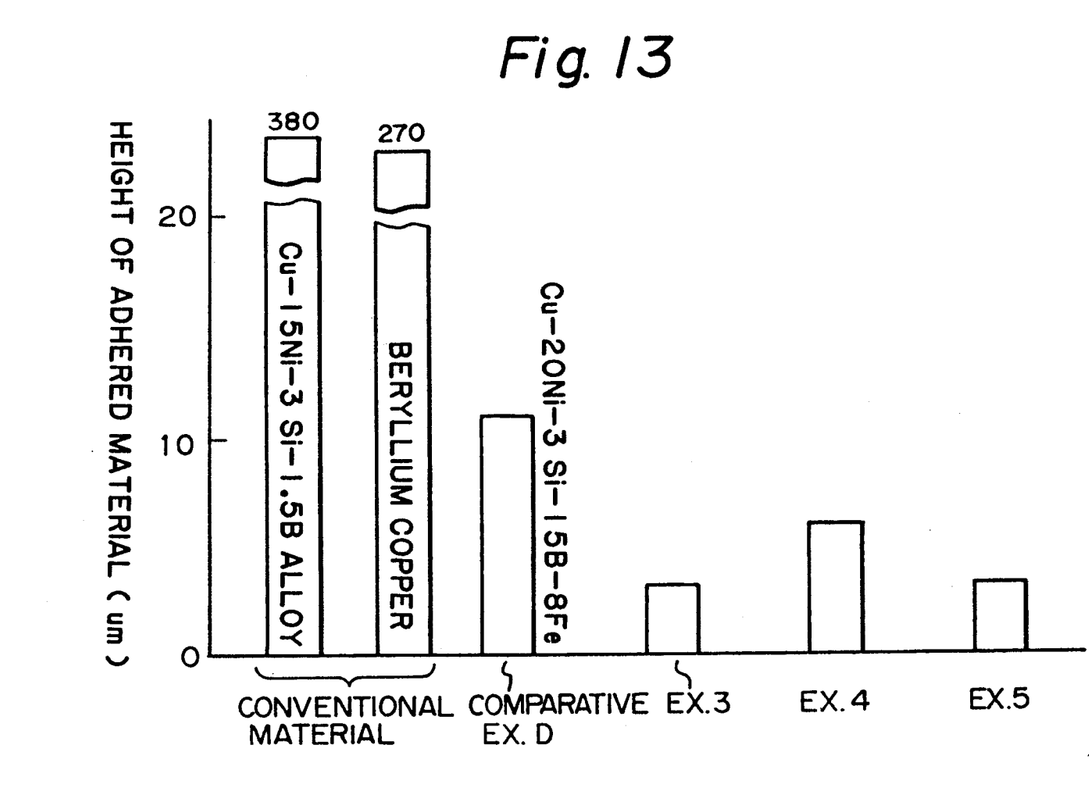
FIG. 13 is a graph showing the results (height of adhered materials) of the adhesion tests.

The results (wear dent lengths) of the abrasion test are shown in FIG. 12, together with the results of conventional wear-resistant material such as a copper-base alloy of Cu-15Ni-3Si-1.5B and a beryllium copper (Cu-Be) alloy. As can be seen from FIG. 12, the particle dispersion-strengthened Cu-base alloys according to the present invention have shorter wear dent lengths than those of the conventional materials and thus have a superior wear-resistance to sliding abrasion.

Test of Adhesion Property

To evaluate an adhesion property of the Cu-base alloy overlays of Example 3, 4 and 5, the Cu-base alloy overlay D (the comparative example) in Example 1, and the conventional wear-resistant material such as the Cu-15Ni-3Si-1.5B alloy and a Cu-Be alloy, as shown in FIG. 3, a test piece 14 with the overlay 13 (or without an overlay) was reciprocatively pushed against a valve member 12 of 21Cr-4Ni steel heated by the heater 11. The test conditions were: a heating temperature of 300° C; a pushing force F of 20 kgf (a pressure of 5 kg/mm$^2$); a reciprocating distance L of 5 mm; a reciprocating rate of 500 cycles/min; and a test time of 30 minutes. After the test, a height of the adhered materials 15 on the valve member 12 (FIG. 4) was measured with a roughness instrument, to obtain the results shown in FIG. 12. As is obvious from FIG. 12, the Cu-base alloys of the present invention (Examples 3, 4 and 5) have lower heights and less amounts of adhered Cu-base alloy materials 15, compared with the Cu-base alloy D of the comparative example and the conventional materials, because the Cu-base alloy containing Pb according to the present invention has the effect of Pb serving as a lubricant at a high temperature.

As mentioned above, the particle dispersion-strengthened Cu-base alloys according to the present invention have a superior wear-resistance, in particular, an improved resistance to adhesion, due to the addition of Sn and/or Zn or the use of Pb as a solid lubricant. Furthermore, it is possible to form an overlay by depositing the particle dispersion-strengthened Cu-base alloy wholly or locally on a metal substrate. Therefore, the overlay of the particle dispersion-strengthened alloy of the present invention can be formed on portions of various mechanical parts including a valve seat, which must be wear-resistant, to improve the wear-resistance without any deterioration of other properties of the mechanical parts.

It will be obvious that the present invention is not restricted to the above-mentioned embodiments, and that many variations are possible for persons skilled in the art without departing from the scope of the invention.

We claim:

1. A dispersion strengthened copper-base alloy for a wear-resistant overlay formed on a metal substrate consisting essentially of, by weight %,
   Ni: 5 to 30%;
   B: 0.5 to 3%;
   Si: 1 to 5%;
   Fe: 4 to 30%;
   at least one metal selected from the group consisting of 3 to 15% of Sn and 3 to 30% of Zn; and
   the remainder being Cu and unavoidable impurities, and having a structure in which particles of boride and silicide of the Fe-Ni system are dispersed in a Cu-base matrix and Cu-base primary crystals contain Sn and/or Zn in a solid solution state.

2. A copper-base alloy according to claim 1 consisting essentially of, by weight %,
   Ni: 10 to 25%;
   B: 1.0 to 2.0%;
   Si: 2 to 4%;
   Fe: 4 to 15%;
   Sn: 5 to 10% and/or Zn: 5 to 15%; and
   the remainder being Cu and unavoidable impurities.

3. A copper-base alloy according to claim 1, further comprising, by weight %, at least one metal selected from the group consisting of 0.1 to 5% of Al, 0.1 to 5% of Ti, and 1 to 10% of Mn.

4. A copper-base alloy according to claim 1, further comprising, by weight %, 0.02 to 2% of C, and at least one metal selected from the group consisting of 0.1 to 10% of Cr and 0.3 to 5% of Ti.

5. A dispersion strengthened copper-base alloy (for a wear-resistant overlay formed on a metal substrate) consisting essentially of, by weight %,
   Ni: 5 to 30%;
   B: 0.5 to 3%;
   Si: 1 to 5%;
   Fe: 4 to 30%;
   Pb: 2 to 20%; and
   the remainder being Cu and unavoidable impurities, and having a structure in which particles of boride and silicide are dispersed in a Cu-base matrix, and nonsoluble Pb particles are uniformly dispersed between Cu-base α phase dendrites.

6. A copper-base alloy according to claim 5 consisting essentially of, by weight %,
   Ni: 10 to 25%;
   B: 1.0 to 2.0%;
   Si: 2 to 4%;
   Fe: 4 to 15%;
   Pb: 3 to 10%; and
   the remainder being Cu and unavoidable impurities.

7. A copper-base alloy according to claim 5 further comprising, by weight %, 1 to 20% of high melting point carbide particles.

8. A copper-base alloy according to claim 5 further comprising, by weight %, at least one metal selected from the group consisting of 0.1 to 5% of Al and 1 to 20% of Cr.

9. A copper-base alloy according to claim 8 further comprising, by weight %, 1 to 20% of high melting point carbide particles.

10. A copper-base alloy according to claim 6 further comprising, by weight %, at least one metal selected from the group consisting of 3 to 15% of Sn and 3 to 30% of Zn.

11. A copper-base alloy according to claim 10 further comprising, by weight %, at least one metal selected from the group consisting of 5 to 10% of Sn and 5 to 15% of Zn.

* * * * *